United States Patent [19]

Faanes

[11] Patent Number: 5,048,376
[45] Date of Patent: Sep. 17, 1991

[54] TOOL, MOUNTING MEANS AND RING DEVICE FOR ANTI-SKID CHAINS

[76] Inventor: Odd Faanes, P.O. Box 126, 2001 Lillestrøm, Norway

[21] Appl. No.: 475,969

[22] Filed: Feb. 6, 1990

[30] Foreign Application Priority Data

Feb. 13, 1989 [NO] Norway ................................. 890606
Jun. 28, 1989 [NO] Norway ................................. 89273

[51] Int. Cl.⁵ ............................................. B60C 27/06
[52] U.S. Cl. ................................................. 81/15.8
[58] Field of Search ............................ 81/15.8, 488

[56] References Cited

U.S. PATENT DOCUMENTS

| | | | |
|---|---|---|---|
| 1,386,413 | 8/1921 | Lavoie | 81/15.8 |
| 1,453,874 | 5/1923 | Hotchkiss | 81/15.8 |
| 1,534,284 | 4/1925 | Pelletier | 81/15.8 |
| 1,542,629 | 6/1925 | Massuere | 81/15.8 |
| 1,802,689 | 4/1931 | Wenrich | 81/15.8 |
| 2,868,052 | 1/1959 | Corbin | 81/15.8 |
| 2,946,365 | 7/1960 | Timson | 81/15.8 |
| 3,303,729 | 2/1967 | Webb et al. | |

FOREIGN PATENT DOCUMENTS 0685232 11/1939 Fed. Rep. of Germany ....... 81/15.8

Primary Examiner—Frederick R. Schmidt
Assistant Examiner—Lawrence Cruz
Attorney, Agent, or Firm—Fleit, Jacobson, Cohn, Price, Holman & Stern

[57] ABSTRACT

Tool (20,40), a ring device (63,64) and a mounting means (8), the chain being adapted to mounting on vehicle wheel (1;11) having an elastic tire (3;13).

The mounting means comprises portions (8) adapted to engagement with coacting mounting means (30) of the tool for attachment of attachment elements (5;15) of the chain on flange portions (7) of the rim (2;12) having a U-shaped cross section, or on ring devices (63,64) being connected with similar flange portions (17).

The tool (20) is adapted to rest against a radially inwardly facing surface of the rim, to be connected to the chain and to be swung towards the axis of the wheel and about the place of rest for tensioning of the chain and attachment of the attachment elements. According to the invention the ring device is adapted to be attached to funnel-shaped flanges (17) of the rim, and comprises a ring (63) having a U-shaped cross section and being adapted to be attached to the rim by means of a plurality of clips (64), the ring (63) and the rim flange (17) being conformingly shaped.

The tool (20) extends substantially at a small angle relative to the wheel ring plane in such a way that the attachment element (5) of the chain may be attached to the ring (63) or the rim flange (17) by swinging of the tool towards this plane following tensioning of the chain.

7 Claims, 3 Drawing Sheets

TOOL, MOUNTING MEANS AND RING DEVICE FOR ANTI-SKID CHAINS

BACKGROUND OF THE INVENTION

1. Field of the Invention

The invention relates to a tool for mounting and removing anti-skid chains or the like on vehicle wheels having elastic tires, the chain having attachment elements for attachment of the chain to the wheel rim, the tool acting on the principle of a lever and having a first arm portion extending from a seizing or gripping portion adapted to be seized by the hand, to an engagement portion adapted to engage with coacting mounting means of the chain and a second arm portion extending from the engagement portion to a resting or abutment portion adapted to bear against a radially inwardly facing surface of the rim in such a way that the tool in its operating position, i.e. when the engagement portion is connected to the mounting means and the resting portion is resting against the rim, may be swung for tensioning or loosening of the chain with the resting portion as the fulcrum.

The invention also relates to a mounting means for anti-skidding chains or the like for vehicle wheels having elastic tires, the chains being provided with attachment elements for attachment of the chain to the wheel rim by means of a tool of the above-mentioned type; and the mounting means being adapted to engagement with the engagement portion of the tool.

Finally the invention relates to a ring device for use in connection with vehicle wheels having elastic tires, and rim flanges upon which the beads of a tire rest in the transverse direction extending, the rim flanges away from the central ring plane of the wheel, and the ring device being adapted to cooperate with attachment elements of anti-skid chains or the like having a mounting means of the above-mentioned type, which may be mounted by means of a tool of the above mentioned type, the ring device comprising a ring which is adapted to bear against and to be attached to the side of these flanges facing the axis of the wheel, and mutually opposing sides of the ring and the flange being conformingly shaped.

2. Description of Prior Art

In DE-PS 685 232 there is described a tool of the above mentioned type, having two articulatedly interconnected arms, the first arm being used for tensioning of the chain, the second arm at the same time being used for bringing hook devices of the chain into engagement with the tire of the wheel.

The tool is complicated, and as each hand is used for different operations, the use of the tool is difficult. Due to the fact that the second arm cannot be used for removal of the hook device, removal must be carried out by seizing of the hook device by hand, which may be hazardous.

In use the tool extends essentially laterally away from the wheel. Mounting of chains on vehicles whose wheels are embedded in for example deep snow is thus cumbersome, in that both the snow at the side of the wheels and at a relatively large distance therefrom must be removed in order to provide access for the operation the tool. If the vehicle should be close to for example a wall of a house or a rock, mounting of the chain may be impossible.

Also in U.S. Pat. No. 2,074,534 it is shown a tool which during use extends transversely away from the wheel, and whereby the tensioning of the chain must be carried out by using only one hand. The tensioned hook device of the chain must be seized by the other hand in order to force the hook device into engagent with the wheel. The use of this tool is therefore probably more dangerous and cumbersome than the above-mentioned tool.

It is also known that chain hooks may be hooked onto a rim flange having a U-shaped cross section, i.e. rims whose free flange edge portion is extending radially inwardly towards the axis of the wheel. The mounting of the chain is carried out by initially laying the chain around the tire, whereupon a plurality of first hooks are attached to the inward flange, i.e. the flange that extends inwardly towards the plane of symmetry of the vehicle, whereafter a plurality of second hooks finally are hooked onto the outer flange.

For rims without such flange portion it is known that there may be provided rings being adapted to be attached to the rim and having a flange edge portion. From U.S. Pat. No. 2,998,835 and DE published print 1 931 159 it is known that rings may be adapted to be introduced into a cylindrical flange portion of the rim and to be fixedly held therein due to a mutual press fit.

Wheels of vehicles are however experiencing corrosion, especially automobile wheels used on roads where salt is used for melting of ice and snow, whereby such corrosion between the ring and the rim flange may cause deterioration of the press fit connection therebetween to a such degree that the ring and the chain may be disengaged from the wheel. There is further a risk that existing corrosion on the rim may make the use of such rings impossible if rings are to be mounted on used rims.

A precondition for a press fit connection is that the coacting parts must be produced with small tolerances which in turn entails high production costs. Rings of this type however cannot be mounted on funnel-shaped flanges.

DE published print 1 931 159 describes rings that may be attached by means of welding, screws or the like. The use of such, methods of attachment require highly qualified personel and rims being in advance exactly adapted to the rings for the mounting thereof.

From U.S. Pat. No. 3,095,919 it is known that U-shaped rings may be adapted to engagement with transversely extending chain cross links. The links have terminal loops and the rings have hooks that may be introduced into the loops. The rings are pressed into position or split and provided with latch devices, but again these rings cannot be mounted on funnel-shaped rim flanges.

From U.S. Pat. No. 2,241,592 it is known that a split ring may be introduced between the rim and the tire bead. The rim absorbs the total force which is exerted by the chain and receives little direct support from the rim, and so as not to be thrown out it has to be provided with a latch device. This makes the ring heavy and relatively complicated.

From U.S. Pat. No. 2,146,453 it is known that a ring may be held radially on the inside and at a distance from the flange by means of separate clips arranged between the rim and the tire. For the clips not to be thrown out, they must also extend between the tire bead and the cylindrical portion of the rim, which will cause air leakage for wheels provided with tubeless tires. Due to the fact that the ring is not bearing against the rim, it has to be strong in order to withstand the tensile force exerted by the clips without being distorted, and it thus becomes heavy.

From U.S. Pat. No. 2,598,594 it is known that separate hooks may be attached between the tire and the rim, similar to the clips shown in U.S. Pat. No. 2,146,453.

From U.S. Pat. Nos. 2,664,133, 2,681,094 and 3,165,137 it is further known that small hooks may be adapted to atachment to the rim. Relatively large bending moments are however exerted against the hooks compared to the bending moments exerted against a ring, and there is a risk for the hooks to be pressed out of engagement with the rim.

In U.S. Pat. No. 2,898,968 it is shown that separate holders may be attached to the rim or to separate clips which in turn are embedded between the tire and the rim. These holders are heavy and must be arranged very carefully in order not to unbalance the wheel. The shape of the holders and the clips is very complicated, and those holders being adapted to funnel shaped rim portions may be prone to be moved gradually outwardly and become detached from the rim, especially due to centrifugal force when the chain is not mounted.

BRIEF SUMMARY OF THE INVENTION

The purpose of the invention is to provide a mounting tool and a coacting mounting means of an anti-skid chain or the like, and a ring device which may be used together with the tool and the chain, which are not burdened with the above-mentioned drawbacks.

This is accomplished by a tool, a ring device and a mounting means according the invention. The mounting means comprises portions adapted to engagement with coacting portions of the tool for attachment of elements of the chain on flange portions of the rim having U-shaped cross section, or on ring devices comprising a ring which is adapted to be connected with rim flange portions. The tool (20) is adapted to rest or abut against a radially inwardly facing surface of the rim, to be connected to the chain and to be swung towards the axis of the wheel and about the resting place for tensioning of the chain and attachment of the attachment elements. The ring device is adapted to be attached to funnel-shaped flanges of the rim, and comprises a ring having a U-shaped cross section and being adapted to be attached to the rim by means of a plurality of clips, the ring and the confronting rim flange being conformingly shaped. The tool extends substantially at a small angle relative to the wheel ring plane in such a way that the attachment element of the chain may be attached to the ring or the rim flange by swinging of the tool towards this plane following tensioning of the chain and vice versa.

DESCRIPTION OF DRAWINGS

The invention will now be explained in detail in the following description with reference to the accompanying drawings which show embodiments of a tool, the mounting means and the ring device according to the invention, and wherein.

DESCRIPTION OF PREFERRED EMBODIMENTS

Figure 7:
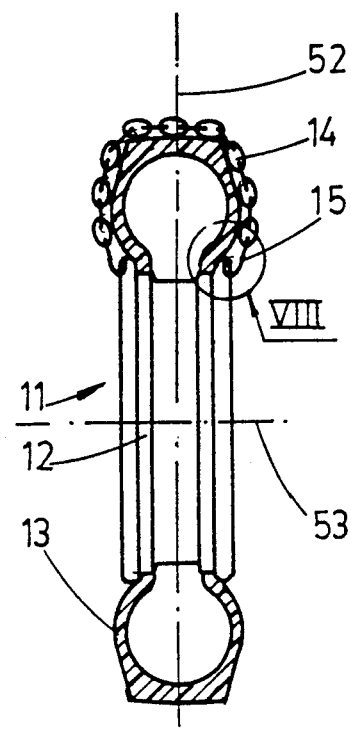
FIG. 7 is as cross sectional view of the wheel shown in FIG. 6, taken along the line VII—VII of FIG. 6.

By the term wheel ring plane mentioned herein is meant the plane (52) which comprises the symmetry line of the tire cross sections (FIG. 5 and 7), by the term wheel axis is meant the axis (53) which extends at right angles to the wheel ring plane and through the ring center of the wheel (FIG. 7), by the term transverse direction of the wheel is meant the direction along the wheel axis (53), and by the expressions inwardly and outwardly are meant the transverse directions from the wheel ring plane towards the symmetry plane for the vehicle whereupon the wheel is mounted, or away from this plane respecticely, if such directions are not further specified.

Figure 1:
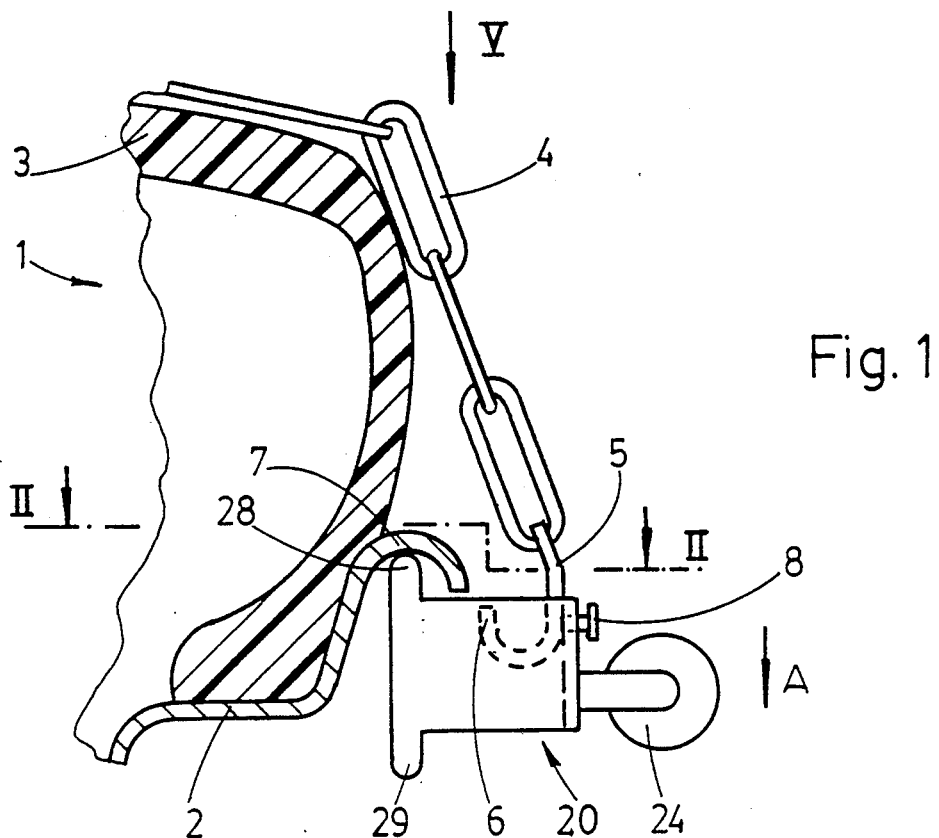
FIG. 1 is as cross sectional view through the upper portion of an automobile tire and rim with a chain arranged thereupon, and a first embodiment of a tool according to the invention.
Figure 2:
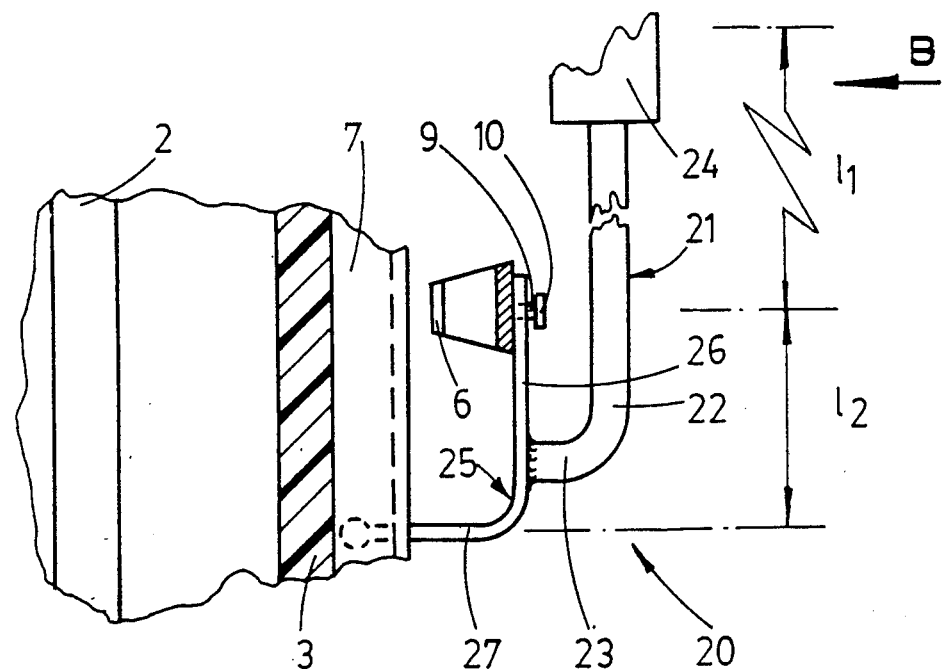
FIG. 2 is a cross sectional view taken along the line II—II in FIG. 1.

As shown in FIGS. 1 and 2 a tire 3 is mounted on the rim 2 of a wheel 1, for instance an automobile wheel. The rim has inwardly and outwardly facing flange portions 7, which in cross section are substantially U-shaped, the opening thereof facing towards the axis of the wheel. In order to increase the gripping capability of the tire, i.e. the friction between the wheel 1 and the ground, for example a plurality of short chain cross links 4 extending across the wheel are attached thereto, each of the links having two terminal hook or attachment elements 5 with hook portions 6 facing the ring plane and being adapted to attachment to the respective flange portions 7. On the side of the hook elements 5 opposing the hook portions 6, the hook elements 5 are provided with a mounting means comprising a projecting pin 8 having a shank portion 9 and a head or end portion 10 forming a shoulder extending transversely relative to the longitudinal direction of the shank portion 9.

For the cross link to be secured to the wheel under all driving conditions, its length is such that it will be heavily tensioned due to the elastic deformation of the tire when the link is mounted on the wheel. The hook elements therefore cannot be attached by the hand, the necessary pulling force being too large.

Figure 3:
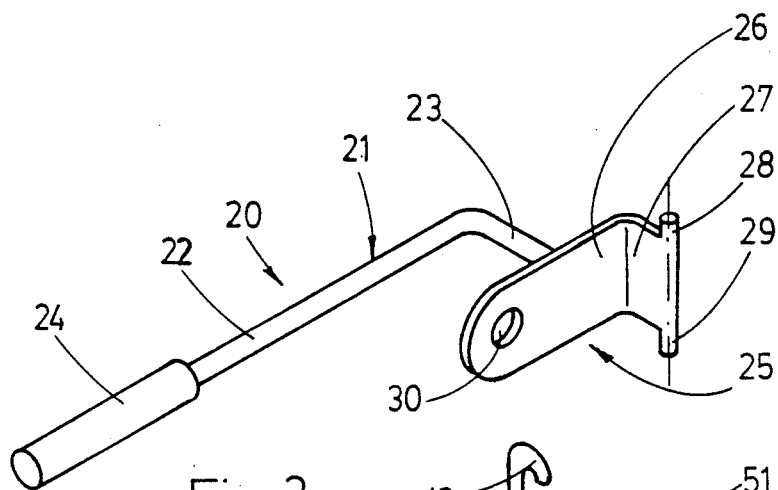
FIG. 3 is a perspective view of the tool shown in FIG. 1 and 2.

In FIGS. 1, 2 and 3 there is shown a first embodiment of a mounting tool 20 by means of which the cross link may be mounted on a wheel. The tool comprises a rod 21 having a first second rod portions 22 and 23 respectively, whose longitudinal axes extending mutually at right angles.

On the free end portion of the first rod portion 22 there is mounted a handle 24, and the second rod portion 23 is fixedly connected to a first portion 26 of a plate 25, and extends at right angles to the plate plane thereof. A second, shorter portion 27 of the plate 25 extends in a plane at right angles to the longitudinal axis of the first rod portion 22. Opposing end edge portions of the second plate portion 27 are formed as two protruding pins 28,29, the longitudinal axis of each which extends parallel to the plate plane of the first plate portion 26. In the first plate portion 26 there is formed a hole 30, the diameter of which is somewhat larger than the diameter of the head portion 10 of the pin 8, so that the pin 8 may be introduced into the hole. The length of the shaft 9 of the pin 8 is thereby somewhat larger than the thickness of the plate portion 26, the headportion 10 thereby preventing the pin from being drawn axially out of the hole when the pin is completely inserted therein and its shank portion 9 is bearing against the edge of the hole.

Figure 5:
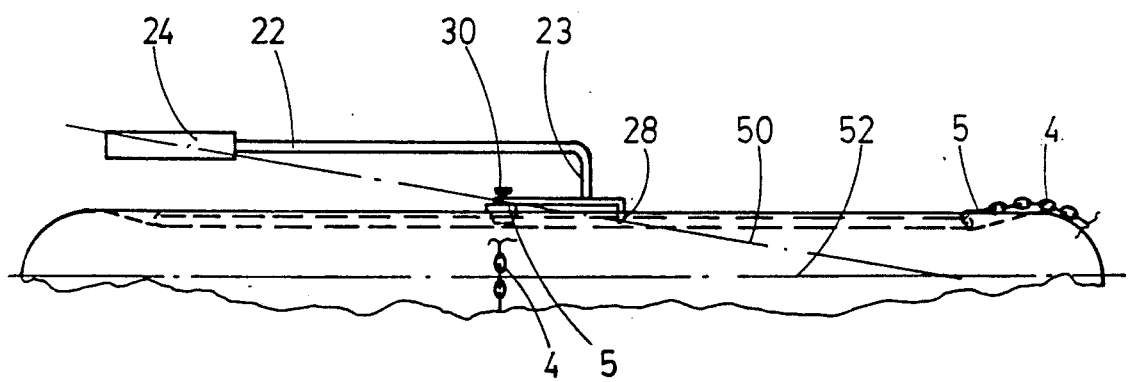
FIG. 5 is a reduced view in the direction of the arrow V in FIG. 1, where portions of the wheel have been omitted.

For mounting of a cross link having two hook elements 5, at respective ends of the link one hook element is initially attached to the inner rim flange portion 7 of the wheel, whereupon the link is laid across the tire in such a way that its second hook element 5 is arranged close to the outer rim portion 7 and the hook portion 6 facing inwardly. Thereupon one pin, for example the pin 28 of the tool is inserted into the radially inwardly facing opening of the U-shaped rim portion until it rests on the bottom thereof, and the pin 8 of the outer hook element 5 is introduced into the hole 30 of the tool as shown in FIGS. 1,2 and 5, whereupon the handle 24 is moved in the direction of the arrow A in FIG. 1, i.e. in a plane which extends parallel to the wheel ring plane 52. The tool is thereby swung with its resting point on the rim as a fulcrum, and the cross link is tensioned until the free end of the hook portion 6 is closer to the wheel axis than the radially inward free edge of the flange portion 7, as shown in FIG. 1. The tool is thus acting on the principle of a lever of the second order, one arm portion thereof being constituted by that portion of the tool extending from the handle 24 to the hole 30, i.e. the rod 21 and that area of the plate portion 26 which is lying between the hole 30 and the rod portion 23, and the second arm portion being formed by the plate portions 26 and 27.

Upon swinging of the tool with the pin 28 a fulcrum and in the directin of the arrow B in FIG. 2, the hook portion is thereafter brought to a position in which it lies radially inwardly of the rim portion 7, whereupon a reduction of the force with which the handle is pressed in the direction of the arrow A causes the tool to be swung in the opposite direction thereto until the hook portion 6 is bearing against that surface of the flange portion 7 which is facing the axis of the wheel. If it is more convenient the tool may be turned 180 degrees in the said plane which extends parallel to the ring plane, in a such way that the pin 29 instead of the pin 28 is used for bearing against the rim portion 7.

For removing the cross link the above-mentioned operations are performed in the opposite sequence, the head portion 10 of the pin 8 thereby ensuring the connection between the tool and the hook element 5 and carrying of the hook portion 6 when the tool is swung opposite to direction of the arrow B in FIG. 2. Thus, during removal of the link both hands may be used for seizing of the handle and swinging of the tool, which ensures safe use thereof.

Figure 4:
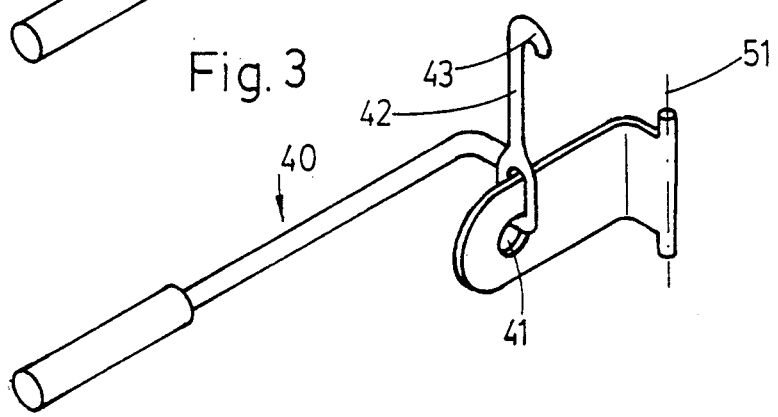
FIG. 4 is a perspective view of a second embodiment of a tool according to the invention.

For large wheels for which the radial dimension of the side of the tire is large, a second embodiment 40 of the mounting tool shown in FIG. 4 is preferrably used, whereby it is avoided that the outer portion of the cross link which extends along the outer side of the tire will bear thereon during tensioning of the cross link and a frictional force will be exerted between the outer link portion and the adjacent side of the tire. The pulling force is then exerted against link portions being closer to the inner hook element.

This embodiment resembles the above-mentioned embodiment, but the second embodiment comprises a rod-shaped link 42 pivotally connected to the first plate portion at an eye 41 corresponding to the hole 30 of the tool 20. The cross section of the link 42 is considerably less than the width of the links of the cross link, and it is provided with a hook portion 43 which is adapted to attachment to a link at the outer side of the tire, close for the tire face. When the tool is brought into engagement with the rim as mentioned above in connection with the tool 20, and swung for tensioning of the cross link, the thin rod-shaped link 42 will not bear against the side of the tire.

As can be seen in FIGS. 1, 3, 4 and 5 the edges of the holes 30 and 41 are substantially lying on a straight line 50 extending between the mid-portion of the handle 24 and one of the pins 28,29. It is thereby ensured that the force which is exerted by the pin 8 of the hook portion towards the edge of the hole 30,41 of the tool during the use thereof, does not cause rotation of the tool about this connecting line. For the hook element 5 and the handle 24 to have a proper and convenient position relative to the wheel, however, and to avoid that the operation of the tool might be obstructed due to a possible interference between portions of the tool and portions of the wheel, the rod 22 and the plate 25 have portions extending at a distance from the connecting line 50, as shown in the figures.

In its operating position the tool extends close to the wheel, i.e. in such a way that the angle between the wheel ring plane 52 and the connecting line 50 is small. The chain may therefore be mounted even if the access to the wheel on the outside thereon is poor, for example due to the fact that the wheel is positioned close to a wall of a house or a rock.

While the illustrated embodiments of the tool are advantageous, it may however comprise a rod which extends more rectilinear from the pin 28,29 to the handle 24 if the shape of the wheel so permits. The arm portion of the tool extending from the handle 24 to the hole 30,41 may thus for example be formed by a straight rod extending at a small angle relative to the plate plane of the plate 25, and forming an extension of this plate.

As mentioned above the first embodiment of the tool according to the invention is provided with a hole 30, and the hook element 5 is provided with a pin 8, but the tool may of course instead be provided with a pin, and a hole adapted to the pin may be formed in the hook element. Even if the above-mentioned tool as described above is used in connection with a cross link, it may of course be used in connection with any flexible or articulated device being adapted to mounting on a tire and being provided with attachment elements as mentioned above.

Figure 6:
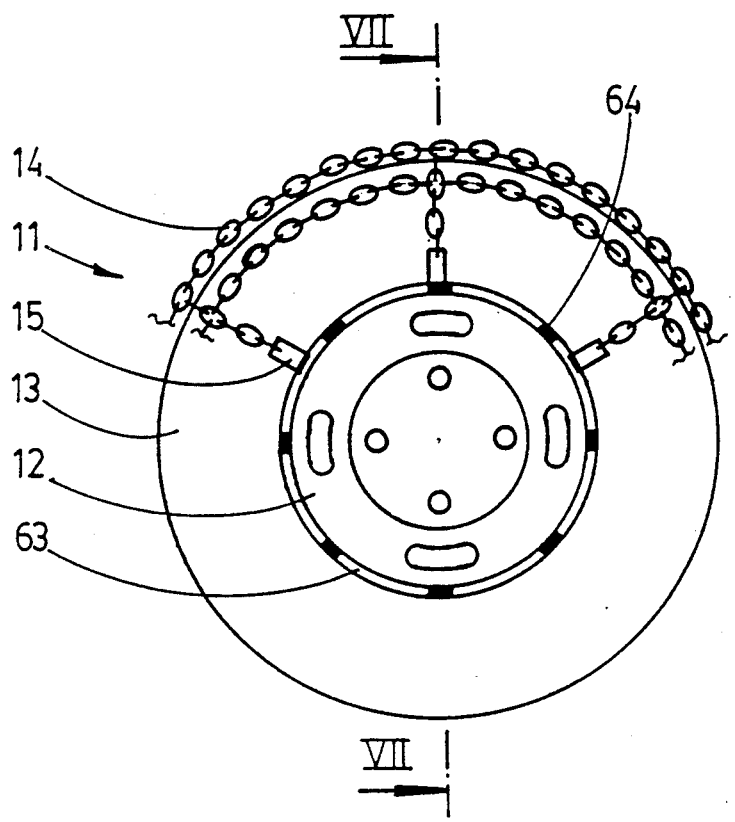
FIG. 6 is a side elevational view of an automobile wheel having a chain and a ring device according to the invention.
Figure 8:
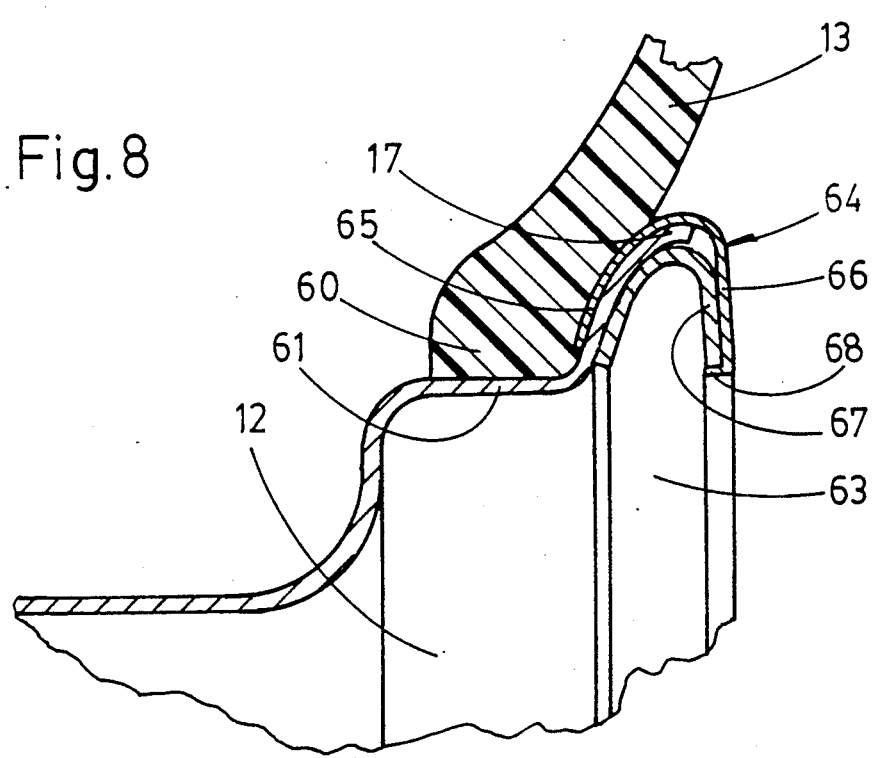
FIG. 8 is an enlarged view of the encircled detail VIII in FIG. 2, where the chain has been removed.

FIG. 6 shows the outwardly facing side of a wheel 11 of a vehicle, for example an automobile. A tire 13 is mounted on the rim 12 of the wheel 11. As is best seen from FIG. 8 the outer bead 60 of the tire 13 is resting on a cylindrical portion 61 of the rim 12 and against an outer flange 17 being integral with the cylindrical portion 61. The flange 17 is substantially funnel-shaped in cross section. The inner bead of the tire is arranged in a similar way, this bearing against an inner flange.

An anti-skid chain is in a known way attached to the wheel rim 12, only a portion of the chain being shown, the chain being arranged along the periphery of the wheel and connected to the rim by means of hook elements 15. As may be seen i FIG. 8 a ring 63 to which the hook elements may be fastened, is attached to the flange 17. The ring has a U-shaped cross section which is open in the direction towards the wheel axis, the inner portion thereof being adapted to the shape of the cross section of the flange 17. The ring may be made of for example a rolled steel plate.

The ring 63 is attached to the flange 17 by means of a plurality of clips 64 which are spaced along the periphery of the ring 63 and the rim 17. The clips may be made of a plate material, for example spring steel, the cross section thereof being likewise substantially U-shaped. The shape of the inner leg 65 of the clips 64 is adapted to the shape of the flange 17, and the shape of the outer leg 66 of the clips 64 is adapted to the shape of the corresponding leg 67 of the ring 63, in such a way that the clips 64 simultaneously substantially enclose the flange 17 and the ring 63 and attach the ring to the flange portion when the ring is inserted therein.

The clips and the ring are preferably coated with a material which prevents corrosion.

Preferably the rings are mounted following the mounting of the tire on the rim and as described below.

The tire bead 60 is initially pressed away from the flange 17 whereupon the ring is to be mounted. The ring 63 is then arranged to bear against the flange 17 whereupon the clips 64 are arranged in such a way that they simultaneously are gripping the flange 17 and the ring 63. When the bead portion 60 finally is brought to bear against the flange 17 and the tire is inflated, the clips 64 will be pressed strongly against the flange, whereby the clips 64 and the ring 63 are retained securely in position.

This method of attachment permits use of rings and flanges, where the quality of the mutual fit and thereby the cost of production may be low.

For additional fastening of the ring 63, the leg of the clips 64 which is bearing against the ring 63 may have an end portion 68 extending at right angles thereto and is adapted to bear against the end of the adjacent, outer flange of the ring. This end portion further prevents radially outwardly movement of the clips.

The open U-shape of the cross section of the clips permits unimpeded arrangement of chain hooks along the flange 17, i.e. also at the position of the clips, as shown for the upper clip in FIG. 6.

Inasmuch as the ring is bearing against the rim and the angle of taper of the funnel-shaped edge portion of the flange often is relatively small, the force exerted by the chain hooks against the ring is substantially transferred to directly to the rim.

As the axial component of the force which is exerted by the chain hooks is relatively small, the ring and the hooks are thus only to a small degree acted upon by axial forces. The plate thickness of the rings and the hooks may therefore be small, and they may consequently be light and cheap.

The ring is suited for use in connection with the tool and the mounting means described above, permitting arrangement of the tool anywhere along the periphery of the ring and close to the positions of the chain hooks.

We claim:

1. A hand tool for applying and removing anti-skid chains to and from vehicle wheels having elastic tires, the tool comprising
    an elongate rod having a handle at one end,
    a plate at an opposite end of the rod,
    a connection between the rod and the plate,
    connector means on the plate for connecting the plate to a hook element of a tire chain cross-link, said connector means being positioned closer to the handle than is said connection, and
    an abutment element on the plate,
    whereby said the abutment element is adapted to engage a rim of said wheel and to act as a fulcrum around which said tool is pivoted to move said hook element of said connected tire chain cross-link, said tool pivoted firstly so as to cause movement of said tire chain cross-link in a direction perpendicular to and inwardly toward a central axis of said wheel so that the position of said hook element is below an edge of said tire rim, said tool is pivoted secondly so as to cause movement of said tire chain cross-link parallel to said axis, said parallel movement being in a direction inwardly toward the tire for chain application and in a direction outwardly away from the tire for chain removal, said tool being pivoted thirdly so as to cause a motion of said hook element of said tire chain cross-link in a direction perpendicular to said axis, a radially outward motion relative to said wheel causing engagement of said hook element with said tire rim for attachment, and a radially inward motion relative to said wheel causing disengagement of said hook element with said tire rim for removal.

2. The tool of claim 1 wherein the connector means is a hole in the plate.

3. The tool of claim 1 wherein the connector means is a hook member pivotally connected to the plate.

4. The tool of claim 1 wherein the abutment element is a pin having an axis substantially perpendicular to a lengthwise axis of the rod.

5. The tool of claim 4 wherein the plate is terminated at an engagement end by a pin rod having a length longer than that of the plate side said pin rod terminates, said pin comprising exposed, non-plate-coterminous portions of said pin rod.

6. The tool of claim 4 wherein the rod has a longer portion including the handle and a shorter portion extending to said connection at an angle to said longer portion.

7. In combination with a vehicle wheel having a wheel axis, a wheel rim on which a tire is mounted and a radially outwardly extending outer rim flange with an inside wall against which an outer bead of the tire engages and an outer wall forming an exterior edge of said rim, a ring having a U-shaped cross section at its periphery for mounting a tire chain on a wheel, said U-shape comprising an inner limb extending inwardly toward the center of the tire and an outer limb extending inwardly in a direction approximately perpendicular to said wheel axis, the inner limb engaging said outer wall of said flange, and U-shaped clips attaching the ring to the wheel, each clip extending over the outer limb of the ring and between the inside wall of said flange and said outer bead of the tire.

* * * * *